(12) United States Patent
Suzuki et al.

(10) Patent No.: US 8,014,076 B2
(45) Date of Patent: Sep. 6, 2011

(54) VARIABLE FOCAL LENGTH LENS, CAMERA MODULE, AND ELECTRONIC APPARATUS

(75) Inventors: Akira Suzuki, Kanagawa (JP); Fumisada Maeda, Tokyo (JP); Mamoru Suzuki, Tokyo (JP); Kayoko Tanaka, Tokyo (JP); Katsuhiro Seo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/817,335

(22) Filed: Jun. 17, 2010

(65) Prior Publication Data

US 2010/0328782 A1    Dec. 30, 2010

(30) Foreign Application Priority Data

Jun. 26, 2009    (JP) ................ P2009-152892

(51) Int. Cl.
*G02B 1/06* (2006.01)
*G02B 3/12* (2006.01)
(52) U.S. Cl. ....................................... 359/666; 359/665

(58) Field of Classification Search ................. 359/665, 359/666
See application file for complete search history.

(56) References Cited

U.S. PATENT DOCUMENTS 7,317,580 B2 *    1/2008    Kogo et al. ................. 359/666

FOREIGN PATENT DOCUMENTS

| JP | 2000-081504 | 3/2000 |
|----|-------------|--------|
| JP | 2008-185627 | 8/2008 |

* cited by examiner

*Primary Examiner* — William C Choi
(74) *Attorney, Agent, or Firm* — K&L Gates LLP

(57) ABSTRACT

A variable focal length lens includes: a lens portion including a pair of light transmissive members, at least one of which is deformable, and a light transmissive liquid medium sealed between the pair of light transmissive members; and a liquid medium container including a chamber that communicates with the lens portion and is filled with the liquid medium, the liquid medium container causing the shape of the surface of the deformable light transmissive member or members to be changed by changing the volume of the chamber to adjust the amount of liquid medium with which the lens portion is filled.

10 Claims, 7 Drawing Sheets

EXEMPLARY CONFIGURATION OF VARIABLE FOCAL LENGTH LENS

EXEMPLARY CONFIGURATION OF VARIABLE FOCAL LENGTH LENS

EXEMPLARY EXTERIOR CONFIGURATION OF LENS BODY

EXEMPLARY CONFIGURATION OF DIAPHRAGM

EXEMPLARY ACTION OF VARIABLE FOCAL LENGTH LENS

EXEMPLARY ACTION OF VARIABLE FOCAL LENGTH LENS

SUMMARY OF MEASUREMENT OF LOADED CHARACTERISTICS OF DIAPHRAGM
FIG.6A  FIG.6B
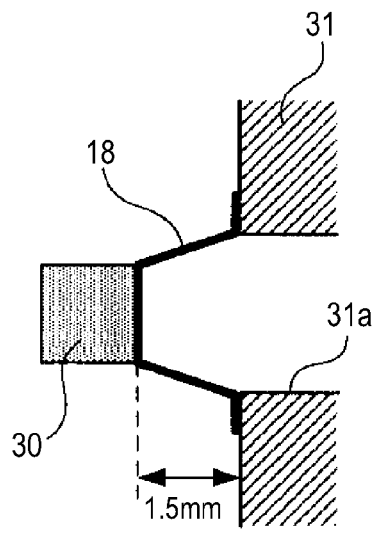
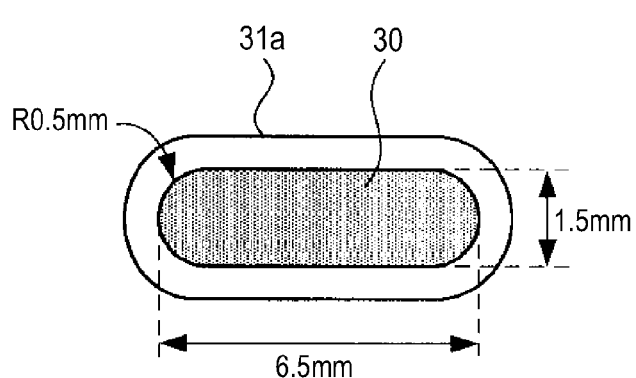
SUMMARY OF MEASUREMENT OF LOADED CHARACTERISTICS OF DIAPHRAGM
FIG.7A  FIG.7B
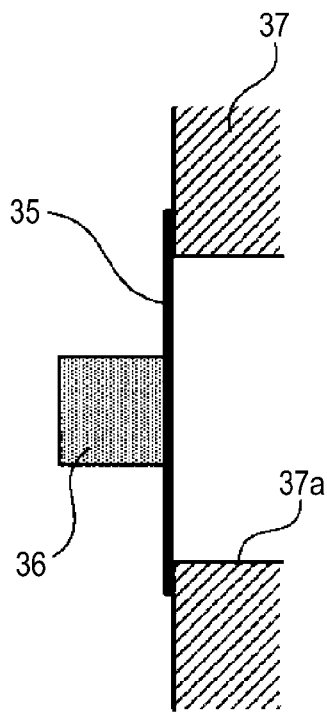
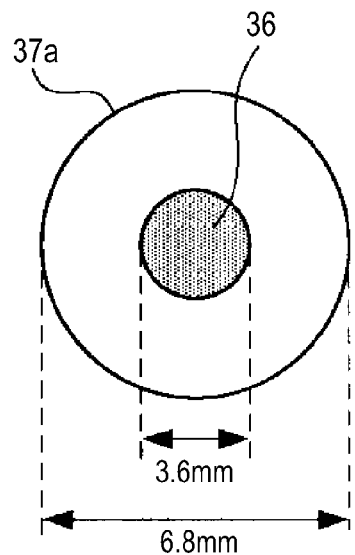

LOADED CHARACTERISTICS OF DIAPHRAGM

EXEMPLARY CONFIGURATION OF DIAPHRAGM ACCORDING TO VARIATION

EXEMPLARY BLOCK DIAGRAM OF IMAGING APPARATUS

EXEMPLARY BLOCK DIAGRAM OF MOBILE COMMUNICATION TERMINAL

VARIABLE FOCAL LENGTH LENS, CAMERA MODULE, AND ELECTRONIC APPARATUS

CROSS REFERENCES TO RELATED APPLICATIONS

The present application claims priority to Japanese Priority Patent Application JP 2009-152892 filed in the Japan Patent Office on Jun. 26, 2009, the entire content of which is hereby incorporated by reference.

BACKGROUND

The present application relates to a variable focal length lens, a camera module, and an electronic apparatus, and more particularly to a variable focal length lens using a liquid medium as a light refracting medium, a camera module and an electronic apparatus including the variable focal length lens.

In imaging apparatus, such as still cameras and video camcorders, and camera modules built in mobile phones, one of the challenges has been reducing the size of an imaging lens optical system. On the other hand, in such imaging apparatus and camera modules, one of the highly requested functions is a focal length changing function, what is called an optical zoom function.

In an existing imaging lens having an optical zoom function (hereinafter referred to as a zoom lens), however, the focal length is changed by moving a plurality of fixed focal length lenses made of glass, resins, or any other suitable materials in the zoom lens in the optical axis direction. The existing zoom lens therefore typically requires providing a lens moving space therein, resulting in difficulty in size reduction. That is, in an existing imaging apparatus or camera module, adding an optical zoom function and reducing the size of the imaging lens optical system are tradeoffs.

To solve the problem described above, it is conceivable to use a variable focal length lens as the zoom lens. Forming a zoom lens with a variable focal length lens eliminates the need for a lens moving space in the zoom lens, solving the problem described above.

As a variable focal length lens of this type, a variable focal length lens using liquid as a light refracting medium has been proposed (see JP-A-2000-81504, for example). In the variable focal length lens proposed in JP-A-2000-81504, the lens surface is deformed to adjust the focal length by applying pressure to a container in which liquid is sealed to deform the liquid.

In another technology having been proposed, an existing variable focal length lens using liquid as the refracting medium is used in a wide converter (see JP-A-2008-185627, for example). JP-A-2008-185627 proposes a method for deforming the lens surface by driving, for example, an external pump mechanism to change the amount of liquid with which the variable focal length lens is filled.

SUMMARY

In an imaging device or a camera module, the two objects of reducing the size of an imaging lens optical system and adding an optical zoom function can be achieved by using a variable focal length lens using liquid as the light refracting medium (liquid lens), as described above. In a variable focal length lens of this type, it is therefore desired to develop a variable focal length lens including a preferable drive mechanism.

As a method for driving a liquid lens, JP-A-2008-185627 has proposed a drive method for changing the shape of the lens surface by changing the amount of liquid with which the lens is filled, as described above. In JP-A-2008-185627, however, a mechanism (such as a pump mechanism) for implementing the drive method is provided outside the liquid lens; the liquid lens itself does not include the drive mechanism. Further, JP-A-2008-185627 describes no specific configuration of the external pump mechanism.

Thus, it is desirable to provide a variable focal length lens using a liquid medium as a light refracting medium and including a drive mechanism that changes the amount of liquid medium with which the lens is filled to deform the lens surface.

According to an embodiment, there is provided a variable focal length lens including a lens portion and a liquid medium container. The lens portion includes a pair of light transmissive members, at least one of which is deformable, and a light transmissive liquid medium sealed between the pair of light transmissive members. The liquid medium container includes a chamber that communicates with the lens portion and is filled with the liquid medium, and causes the shape of the surface of the deformable light transmissive member or members to be changed by changing the volume of the chamber to adjust the amount of liquid medium with which the lens portion is filled.

The "liquid medium" used herein includes not only a liquid but also a fluid medium, such as a gel-like medium.

A camera module according to another embodiment includes the variable focal length lens according to the above embodiment of the invention and an imager that converts subject light incident through the variable focal length lens into an electric image signal.

An electronic apparatus according to still another embodiment includes the variable focal length lens according to the above embodiment of the invention, an imager that converts subject light incident through the variable focal length lens into an electric image signal, and a controller that drives and controls the variable focal length lens.

As described above, a variable focal length lens according to the embodiment includes the liquid medium container, and the shape of the surface (lens surface) of the deformable light transmissive member or members is deformed by changing the volume of a chamber located in the liquid medium container and storing the liquid medium. That is, according to the embodiment of the invention, there is provided a variable focal length lens including a drive mechanism that deforms the lens surface by changing the amount of the liquid medium with which a lens portion is filled.

Since the camera module and the electronic apparatus according to an embodiment include the variable focal length lens according to the embodiment of the invention, an imaging lens optical system incorporated in the camera module and the electronic apparatus can be reduced in size.

Additional features and advantages are described herein, and will be apparent from the following Detailed Description and the figures.

BRIEF DESCRIPTION OF THE FIGURES

FIGS. 6A and 6B schematically describe evaluation of loaded characteristics of the trapezoidal diaphragm used in the variable focal length lens according to the first embodiment;

FIGS. 7A and 7B schematically describe evaluation of loaded characteristics of a flat diaphragm;

DETAILED DESCRIPTION

The present application is described below in greater detail with reference to drawings according to an embodiment. The detailed description is provided as follows:

1. First embodiment: Exemplary basic configuration of variable focal length lens 2. Second embodiment: Exemplary configuration of electronic apparatus including variable focal length lens according to embodiment 3. Third embodiment: Exemplary configuration of another electronic apparatus including variable focal length lens of embodiment 1. First Embodiment

[Configuration of Variable Focal Length Lens]

Figure 1:
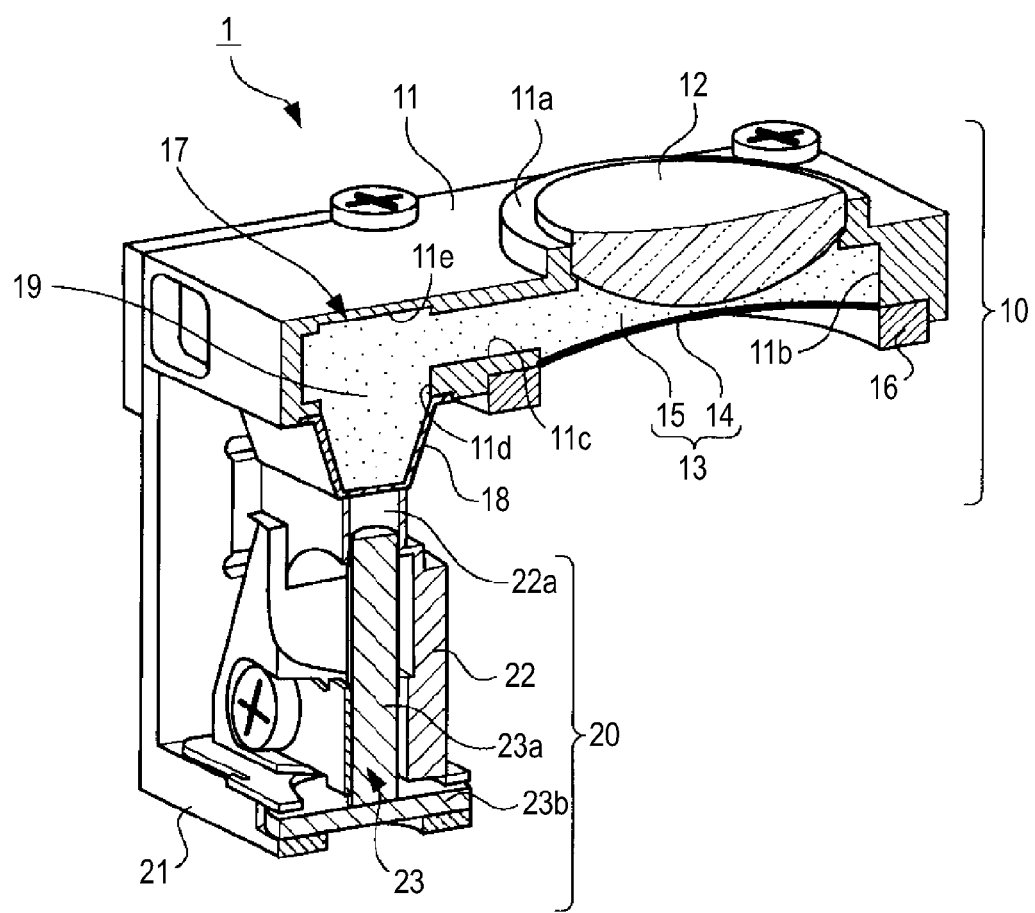
FIG. 1 shows a schematic cross-sectional configuration of a variable focal length lens according to a first embodiment.

FIG. 1 shows a schematic cross-sectional configuration of a variable focal length lens according to a first embodiment. A variable focal length lens 1 includes a lens body 10 and a driver 20 that drives and controls the focal length of the variable focal length lens 1. The variable focal length lens 1 of the present embodiment is a liquid lens using a liquid medium as a light refracting medium.

Figure 2:
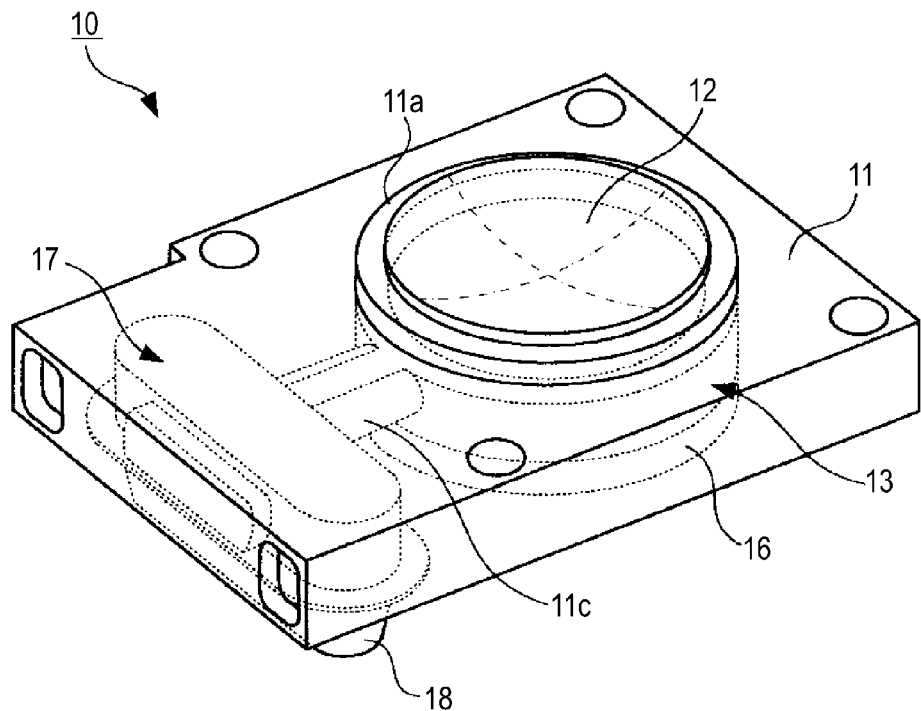
FIG. 2 is an exterior perspective view of a lens body of the variable focal length lens according to the first embodiment.

The configuration of the lens body 10 will first be described with reference to FIGS. 1 and 2. FIG. 2 is an exterior perspective view of the lens body 10. The lens body 10 includes a housing 11, a sealing member 12, a liquid lens portion 13 (lens portion), a fixing member 16, and a liquid container 17 (liquid medium container).

The housing 11 is a box-shaped member having a cavity therein, and one surface (upper surface in FIGS. 1 and 2) of the housing 11 has a circular opening 11a to which the sealing member 12 is attached. The other surface (lower surface in FIGS. 1 and 2) of the housing 11 has a circular opening 11b to which a transparent film 14, which will be described later, is attached and a substantially rectangular opening 11d to which a diaphragm 18, which will be described later, is attached. The opening 11b, to which the transparent film 14 is attached, is formed in an area facing the opening 11a, to which the sealing member 12 is attached.

The housing 11 has a channel 11c formed therein, through which the liquid lens portion 13 communicates with the liquid container 17. The present embodiment will be described with reference to a case where one channel 11c is provided, but the invention is not limited thereto. A plurality of channels 11c may alternatively be provided in the housing 11.

The sealing member 12 (light transmissive member) is fixed at the opening 11a of the housing 11 and seals a liquid medium 15. The sealing member 12 can be formed, for example, of a transparent cover glass, a fixed lens, or a transparent film. In the present embodiment, a fixed lens is used as the sealing member 12. The sealing member 12 has a convex surface facing the liquid lens portion 13 and a concave surface away from the liquid lens portion 13. The sealing member 12 is not necessarily shaped this way, but can be changed as appropriate in accordance with applications and other factors. The sealing member 12 can be made of any material that has desired transmittance across the wavelength band of the light passing through the variable focal length lens 1.

The liquid lens portion 13 is formed of the transparent film 14 (light transmissive member) and the liquid medium 15 sealed between the transparent film 14 and the sealing member 12.

The transparent film 14 is fixed to the end of the opening 11b of the housing 11 by using the fixing member 16, and the thus fixed transparent film 14 seals the liquid medium 15. The surface (lens surface) of the transparent film 14 deforms in accordance with the amount (volume) of liquid medium 15 sealed between the transparent film 14 and the sealing member 12. Specifically, since the transparent film 14 is fixed to the end of the opening 11b of the housing 11 by using the fixing member 16, the surface of the transparent film 14 deforms within a range between a concave shape and a convex shape with the opening 11b being a fixed end in accordance with the amount of liquid medium 15 with which the space between the transparent film 14 and the sealing member 12 is filled.

The transparent film 14 can be made of any material that not only is deformable by a desired amount in accordance with the change in the amount of the liquid medium 15 sealed between the transparent film 14 and the sealing member 12 but also has desired transmittance across the wavelength band of the light passing through the variable focal length lens 1. Specifically, the transparent film 14 can be formed, for example, of a transparent thin film or an elastic film made, for example, of elastomer. Alternatively, the transparent film 14 may be formed of a thin plate made, for example, of glass or a transparent plastic resin.

The liquid medium 15 is made, for example, of a liquid or a fluid material, such as a gel-like material, that has desired optical transmittance across the wavelength band of the light passing through the variable focal length lens 1. Further, the liquid medium 15 is preferably made of a highly nonvolatile material. The liquid medium 15 having the characteristics described above can be silicone oil or any other suitable light transmissive liquid. The liquid medium 15 is selected as appropriate in consideration of applications, a necessary difference in refractive index at the lens interface, and other factors.

The liquid container 17 is primarily formed of the diaphragm 18 attached to the opening 11d of the housing 11 and a liquid chamber 19 defined by the diaphragm 18 and an inner wall 11e of the housing 11 that faces the diaphragm 18. The liquid chamber 19 is filled with the liquid medium 15 and communicates with the interior of the liquid lens portion 13 via the channel 11c.

That is, in the variable focal length lens 1 of the present embodiment, the liquid medium 15 is sealed in the space in the lens body 10 that is defined by the inner wall of the housing 11, the sealing member 12, the transparent film 14, and the diaphragm 18. The configuration with the channel 11c is presented by way of example in the present embodiment, but the invention is not limited thereto. A structure in which the liquid chamber 19 directly communicates with the interior of the liquid lens portion 13 without using the channel 11c may alternatively be used.

The diaphragm 18 deforms in response to a pressing force applied by the driver 20 and changes the volume of the liquid chamber 19. The change in the volume changes the amount (volume) of liquid medium 15 with which the liquid lens portion 13 is filled and hence deforms the transparent film 14. This action will be specifically described later.

Figure 3A:
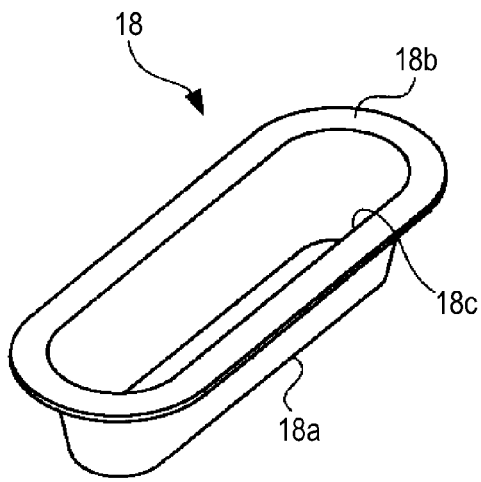
FIG. 3A is an exterior perspective view of a trapezoidal diaphragm used in the variable focal length lens according to the first embodiment when viewed from the front.
Figure 3B:
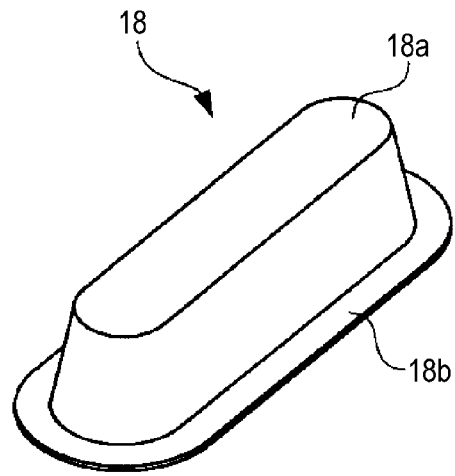
FIG. 3B is an exterior perspective view of the trapezoidal diaphragm viewed from the rear.

FIGS. 3A and 3B show a schematic configuration of the diaphragm 18 used in the present embodiment. FIG. 3A is an exterior perspective view of the diaphragm 18 viewed from the front (from the liquid medium 15 in FIG. 1), and FIG. 3B is an exterior perspective view of the diaphragm 18 viewed from the rear (from the driver 20 in FIG. 1).

The diaphragm 18 is formed of a diaphragm body 18a having a tubular shape with a bottom and a fixing portion 18b provided at an opening 18c of the diaphragm body 18a. The opening 18c of the diaphragm 18 has a substantially rectangular shape with arcuate end sides. The area of the opening 18c of the diaphragm 18 is configured to be larger than that of the bottom of the diaphragm body 18a. In other words, the diaphragm 18 in the present embodiment is a substantially trapezoidal box-shaped member having one open side. The diaphragm 18 in the present embodiment is therefore hereinafter referred to as a trapezoidal diaphragm 18. The shape of the diaphragm 18 can be changed as appropriate in accordance with applications, the shape of the lens body 10, and other factors.

The trapezoidal diaphragm 18 can be made of any material that is deformable when a pressing force is applied by the driver 20. The trapezoidal diaphragm 18 can be made, for example, of a flexible rubber material (EPDM: Ethylene Propylene Diene Monomer), a nitrile rubber (NBR: Nitrile Butadiene Rubber), or a butyl rubber (IIR: Isobutylene-Isoprene Rubber). Alternatively, the trapezoidal diaphragm 18 can be made, for example, of a deformable sheet (thin film) or a flexible molding plastic resin material.

The configuration of the driver 20 will be described with reference to FIG. 1. The driver 20 includes a housing 21, a pressing member 22, and a drive actuator 23 that drives the pressing member 22. In the present embodiment, part of the housing 11 of the lens body 10 is connected to part of the housing 21 of the driver 20 in such a way that the driver 20 is fixed to a lower portion of the liquid chamber 19 of the lens body 10.

The drive actuator 23 drives the pressing member 22, which then applies a pressing force to the bottom of the trapezoidal diaphragm 18. The tip of the pressing member 22 is attached to the bottom of the trapezoidal diaphragm 18. In the present embodiment, the drive actuator 23 moves the pressing member 22 in the direction perpendicular to the bottom surface of the trapezoidal diaphragm 18 (in the vertical direction in FIG. 1) to deform the trapezoidal diaphragm 18. The pressing member 22 includes a holder 22a for holding a rod-shaped member 23a, which will be described later, of the drive actuator 23. The holder 22a can be formed, for example, of a V-shaped groove and a metal portion facing the groove.

The drive actuator 23 drives the pressing member 22 in the direction perpendicular to the bottom surface of the trapezoidal diaphragm 18 (in the vertical direction in FIG. 1). The present embodiment will be described with reference to a case where an actuator called an SIDM (Smooth Impact Drive Mechanism) is used as the drive actuator 23.

The drive actuator 23 includes the rod-shaped member 23a, a piezoelectric device 23b (piezoelectric actuator) attached to the rod-shaped member 23a, and an ultrasonic motor (not shown) that drives the piezoelectric device 23b. The rod-shaped member 23a of the drive actuator 23 is inserted into the holder 22a of the pressing member 22 and held there. The ultrasonic motor drives the piezoelectric device 23b to cause the rod-shaped member 23a to produce ultrasonic vibrations in the axial direction thereof. In this action, the friction produced between the holder 22a of the pressing member 22 and the rod-shaped member 23a as well as the inertia of the pressing member 22 are used to move the pressing member 22 along the axial direction of the rod-shaped member 23a.

The present embodiment has been described with reference to the case where an SIDM is used as the drive actuator 23, but the invention is not limited thereto. Any actuator capable of driving the pressing member 22 in the vertical direction can be used. Usable examples may include an actuator that uses an electric motor to rotate a lead screw and an electromagnetic linear actuator using a voice coil.

[Action of Variable Focal Length Lens]

Figure 4:
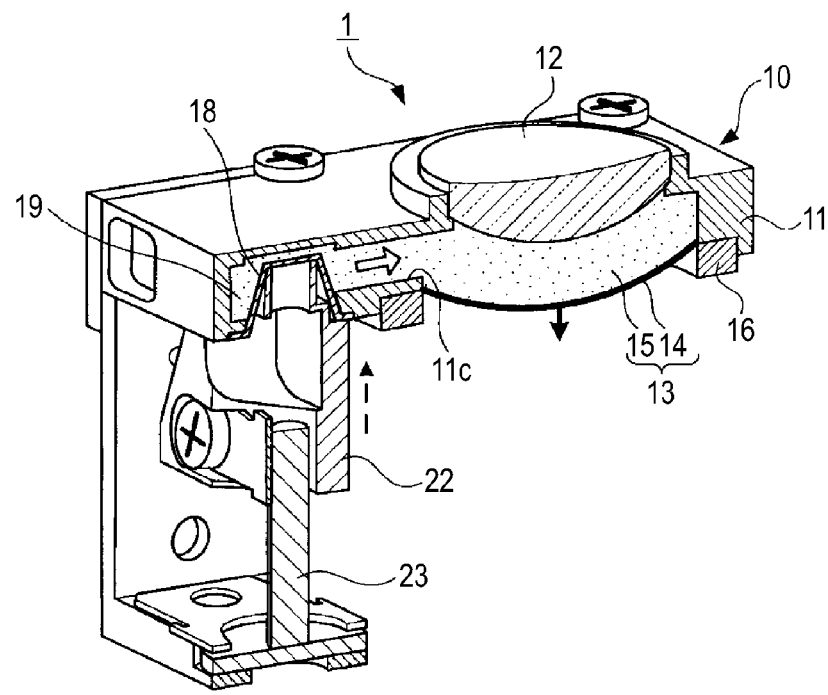
FIG. 4 describes the action of the variable focal length lens according to the first embodiment.
Figure 5:
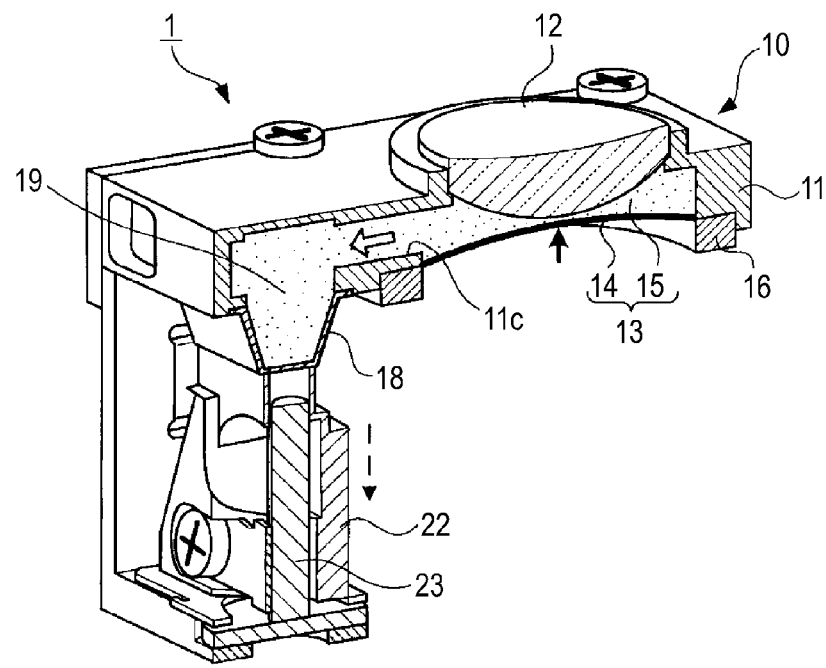
FIG. 5 describes the action of the variable focal length lens according to the first embodiment.

The action of the variable focal length lens 1 of the present embodiment, when driven, will be described with reference to FIGS. 4 and 5. FIG. 4 shows how the variable focal length lens 1 acts when the trapezoidal diaphragm 18 is pushed toward the liquid medium 15, and FIG. 5 shows how the variable focal length lens 1 acts when the trapezoidal diaphragm 18 is pulled toward the driver 20.

First, consider a state in which the liquid lens portion 13 is filled with the liquid medium 15 in such a way that the transparent film 14 of the liquid lens portion 13 has a flat surface (flat lens surface) by lifting the bottom surface of the trapezoidal diaphragm 18 to the vicinity of the opening 11d of the housing 11 (to the height of the fixing portion 18b) (hereinafter referred to as an initial state).

The drive actuator 23 further moves the pressing member 22 from the initial state toward the liquid medium 15 (broken arrow in FIG. 4) to lift the bottom surface of the trapezoidal diaphragm 18 toward the liquid medium 15. In this case, the volume of the liquid chamber 19 decreases, and the liquid medium 15 corresponding to the decrease in volume flows through the channel 11c into the liquid lens portion 13 (between the sealing member 12 and the transparent film 14) (open arrow in FIG. 4). As a result, the amount of liquid medium 15 with which the liquid lens portion 13 is filled increases, and the transparent film 14 of the liquid lens portion 13 protrudes outward from the lens body 10 (thick solid arrow in FIG. 4). Since the outer edge of the transparent film 14 is fixed to the opening 11b of the housing 11 by using the fixing member 16, the shape of the transparent film 14 becomes convex (state shown in FIG. 4).

Conversely, the drive actuator 23 moves the pressing member 22 from the initial state away from the liquid medium 15 (broken arrow in FIG. 5) to lower the bottom surface of the trapezoidal diaphragm 18. In this case, the volume of the liquid chamber 19 increases, and the liquid medium 15 corresponding to the increase in volume flows from the interior of the liquid lens portion 13 through the channel 11c into the liquid chamber 19 (open arrow in FIG. 5). As a result, the amount of liquid medium 15 with which the liquid lens portion 13 is filled decreases, and the transparent film 14 of the liquid lens portion 13 is pulled toward the liquid medium 15 (thick solid arrow in FIG. 5). Since the outer edge of the transparent film 14 is fixed to the opening 11b of the housing 11 by using the fixing member 16, the shape of the transparent film 14 becomes concave (state shown in FIG. 5). In the variable focal length lens 1 of the present embodiment, the driver 20 integrated with the lens body 10 thus changes the shape of the transparent film 14 (shape of lens surface).

As described above, in the variable focal length lens 1 of the present embodiment, the shape (such as the curvature) of the lens surface of the liquid lens portion 13 can be controlled by using the driver 20 to adjust the volume of the liquid chamber 19.

In the variable focal length lens 1 of the present embodiment, the lens surface of the liquid lens portion 13 can be concave to reduce the lens thickness by using the drive actuator 23 along with the pressing member 22 to lower the bottom of the trapezoidal diaphragm 18, as shown in FIG. 5. That is, a thinner lens can readily be formed in the present embodiment. For example, when a solid concave lens, for example, of a glass or plastic material is manufactured, heretofore, the thickness of the thinnest portion of a concave lens can hardly be 0.5 mm or smaller due to manufacturing constraints and other factors. The present embodiment, in contrast, allows such as thin concave lens to be readily formed.

[Loaded Characteristics of Diaphragm]

The present embodiment has been described with reference to the case where the trapezoidal diaphragm 18 is used as a deformable member for adjusting the volume of the liquid chamber 19 as shown in FIGS. 4 and 5, but the invention is not limited thereto. A diaphragm having any shape can be used in accordance with applications, the shape of the lens body 10, and other factors. Among a variety of diaphragms, when a box-shaped diaphragm (a tubular diaphragm with a bottom) having a bottom surface whose area is smaller than that of the opening is used, like the trapezoidal diaphragm 18, the driving force (load) for deforming the diaphragm can be reduced as compared with other types of diaphragm. An advantage provided by reducing the driving force will be more specifically described below.

FIGS. 6A and 6B schematically show a method carried out in the present embodiment for measuring the characteristics of the trapezoidal diaphragm 18 when loaded. FIG. 6A shows the layout of a housing 31 with an opening 31a, the trapezoidal diaphragm 18, and a pressing member 30 used to measure the loaded characteristics of the trapezoidal diaphragm 18. FIG. 6B shows the positional relationship between the pressing member 30 and the opening 31a of the housing 31 when viewed from the pressing member 30 in FIG. 6A.

In the example shown in FIGS. 6A and 6B, the trapezoidal diaphragm 18 has the following dimensions: the length of the bottom=6.5 mm, the width of the bottom=1.5 mm, the radius of curvature of each of the end sides of the bottom=0.5 mm, the depth=1.5 mm, the length of the end surface including the opening=7.5 mm, the width of the end surface including the opening=2.5 mm, and the curvature of each of the end sides of the end surface including the opening=1 mm. The trapezoidal diaphragm 18 is made of EPDM and has a thickness of 0.1 mm. The upper surface of the pressing member 30 and the bottom of the trapezoidal diaphragm 18 have the same shape, and the opening 31a of the housing 31 and the opening of the trapezoidal diaphragm 18 have the same shape.

The loaded characteristics of the trapezoidal diaphragm 18 are measured in the following procedure: First, the trapezoidal diaphragm 18 is placed on the housing 31 in such a way that the end surface including the opening of the trapezoidal diaphragm 18 blocks the opening 31a of the housing 31. The pressing member 30 is then placed on the bottom of the trapezoidal diaphragm 18. Thereafter, from the state in which the trapezoidal diaphragm 18 is not deformed (pre-deformation state shown in FIG. 6A), the pressing member 30 is used to push the bottom of the trapezoidal diaphragm 18 toward the housing 31 by 3 mm. At this point, the relationship between the amount how much the trapezoidal diaphragm 18 is pushed and the load applied to the pressing member 30 in the pushing process is measured.

When the bottom of the trapezoidal diaphragm 18 is pushed toward the housing 31 by 3 mm, the trapezoidal diaphragm 18 displaces a volume of approximately 30 mm$^3$. Further, when the bottom of the trapezoidal diaphragm 18 is pushed toward the housing 31 by 3 mm, the shape of the trapezoidal diaphragm 18 is changed to a reversed pre-deformation shape (state shown in FIG. 6A) with respect to the surface of the housing 31.

Thereafter, from the state in which the bottom of the trapezoidal diaphragm 18 is pushed toward the housing 31 by 3 mm, the pressing member 30 is used to pull the bottom of the trapezoidal diaphragm 18 back to the pre-deformation state of the trapezoidal diaphragm 18. At this point, the relationship between the amount how much the trapezoidal diaphragm 18 is pulled and the load applied to the pressing member 30 in the pulling process is measured.

In the evaluation of the loaded characteristics described above, loaded characteristics of a flat rubber film used as the diaphragm are also measured. FIGS. 7A and 7B schematically show how to measure the loaded characteristics of the flat rubber film. FIG. 7A shows the layout of a housing 37 with an opening 37a, a flat rubber film 35, and a pressing member 36 used to measure the loaded characteristics of the flat rubber 35. FIG. 7B shows the positional relationship between the pressing member 36 and the opening 37a of the housing 37 when viewed from the pressing member 36 in FIG. 7A.

In the example shown in FIGS. 7A and 7B, the thickness of the flat rubber film 35 is 100 μm. The shape of the opening 37a of the housing 37, which is blocked by the flat rubber film 35, is a circle having a diameter of 6.8 mm, and the shape of the upper surface of the pressing member 36 is a circle having a diameter of 3.6 mm. In the measurement, the pressing member 36 is placed at the center of the opening 37a.

In the measurement of the loaded characteristics of the flat rubber film 35, the pressing member 36 is first used to pull the flat rubber film 35 in the direction away from the housing 37 so that the contact surface between the flat rubber film 35 and the pressing member 36 is spaced apart from the surface of the housing 37 by 0.7 mm. From this state, the pressing member 36 is used to push the flat rubber film 35 toward the opening 37a of the housing 37, and the relationship between the amount how much the flat rubber film 35 is pressed and the load applied to the pressing member 36 in the pressing process is measured. In this step, the flat rubber film 35 is pushed until the contact surface between the flat rubber film 35 and the pressing member 36 is inside the housing 37 by 0.7 mm from the surface of the housing 37. The flat rubber film 35 thus displaces a volume of approximately 30 mm$^3$, as in the evaluation of the loaded characteristics of the trapezoidal diaphragm 18.

Figure 8:
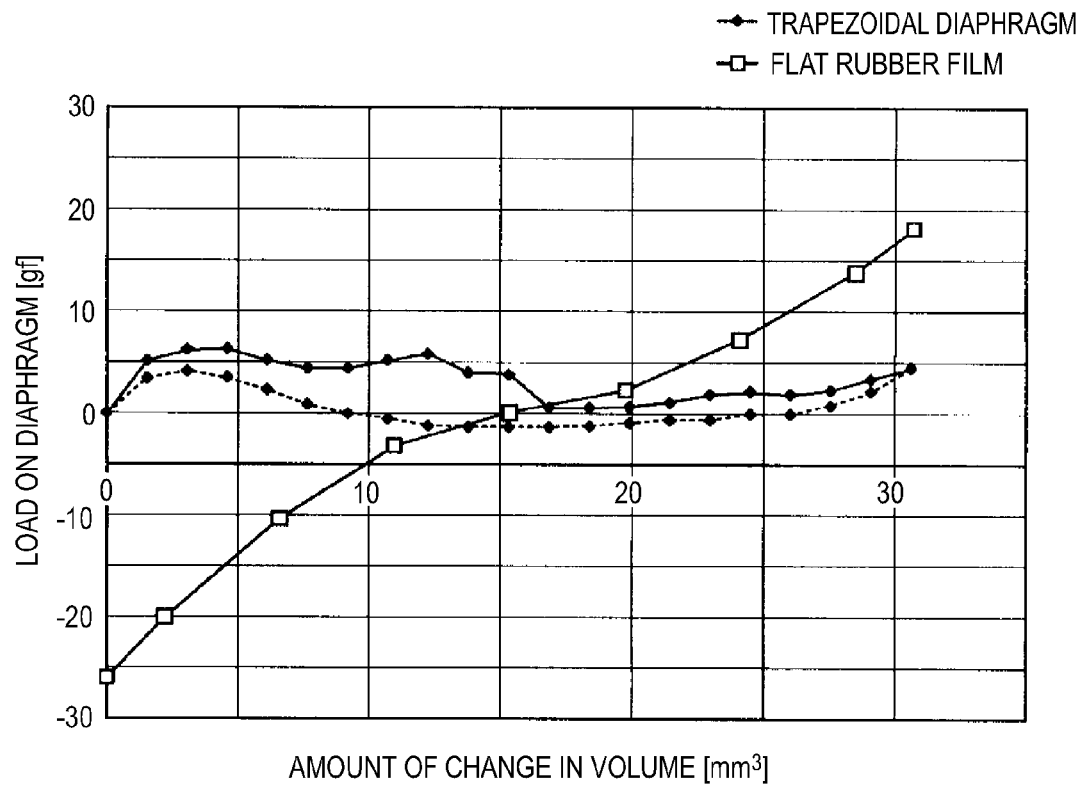
FIG. 8 shows results of the evaluation of the loaded characteristics of the diaphragms.

FIG. 8 shows the loaded characteristics of the trapezoidal diaphragm 18 and the flat rubber film 35 measured as described above. In the characteristics shown in FIG. 8, the horizontal axis represents the volume changed by the trapezoidal diaphragm 18 or the flat rubber film 35, and the vertical axis represents the load applied to the pressing member. In FIG. 8, the characteristics indicated by the connected, filled measurement points represent the loaded characteristics of the trapezoidal diaphragm 18, and the characteristics indicated by the connected, open-rectangle measurement points represent the loaded characteristics of the flat rubber film 35.

FIG. 8 shows two types of loaded characteristics of the trapezoidal diaphragm 18 indicated by the solid and broken lines. The loaded characteristics of the trapezoidal diaphragm 18 indicated by the solid line are obtained when the pre-deformation trapezoidal diaphragm 18 is pushed toward the housing 31. The loaded characteristics of the trapezoidal diaphragm 18 indicated by the broken line in FIG. 8 are obtained when the trapezoidal diaphragm 18 having been pushed into the housing 31 is pulled back to the pre-deformation state.

The loaded characteristics shown in FIG. 8 clearly show that the load necessary to displace a volume of approximately 30 mm$^3$ is smaller in the case of the trapezoidal diaphragm 18 than in the case of the flat rubber film 35. The reason for this is that the reaction force produced when the pressing member pushes or pulls a diaphragm having a trapezoidal box-like shape as in the present embodiment is smaller than that produced when a flat diaphragm is used.

As described above, when the trapezoidal diaphragm 18 is used as the deformable member for adjusting the shape of the lens surface as in the present embodiment, the lens can be driven with a smaller driving force. This advantageous effect is provided by a diaphragm having any shape as long as it is a tubular diaphragm with a bottom whose area is smaller than that of the opening. For example, the advantageous effect described above is provided by using a tubular diaphragm with a bottom and opening, each of which has, for example, a circular, elliptical, or polygonal shape.

[Variation]

In the trapezoidal diaphragm 18 of the first embodiment described above, the portion of the trapezoidal diaphragm 18 that connects the bottom, which comes into contact with the pressing member, to the fixing portion 18b, that is, the side wall portion of the trapezoidal diaphragm 18, has a linear cross-sectional shape, but the cross-sectional shape of the side wall portion is not necessarily linear in the invention. For example, the side wall portion of the diaphragm may be configured to have a folded shape. In a variation, an example of the thus configured diaphragm will be described.

Figure 9:
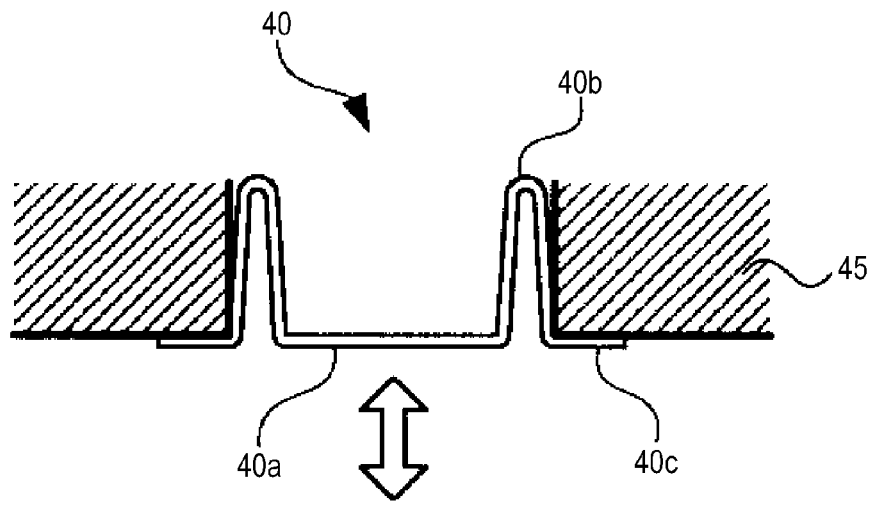
FIG. 9 shows a schematic configuration of a diaphragm according to a variation.

FIG. 9 shows a schematic configuration of the diaphragm according to the variation. In a diaphragm 40 according to the variation, a side wall portion 40b of the diaphragm 40 that connects a bottom 40a, which comes into contact with the pressing member, to a fixing portion 40c has a U-like cross-sectional shape. That is, the side wall portion 40b according to the variation is bent once between the bottom 40a and the fixing portion 40c of the diaphragm 40. Further, the diaphragm 40 according to the variation is configured in such a way that the surface of the bottom 40a of the diaphragm 40 is substantially flush with the surface of the fixing portion 40c (housing 45).

In the first embodiment, to bring the trapezoidal diaphragm 18 into the initial state, the driver 20 is used to push the bottom of the trapezoidal diaphragm 18 toward the liquid medium 15 so that the bottom of the trapezoidal diaphragm 18 is flush with the fixing portion 18b of the trapezoidal diaphragm 18, as described above. That is, in the first embodiment, the state shown in FIG. 9 is achieved by applying a load to the trapezoidal diaphragm 18 to deform the trapezoidal diaphragm 18.

In contrast, since the diaphragm 40 according to the variation is produced by bending the side wall portion 40c in advance, the diaphragm 40 can be brought into its initial state without any load applied to the diaphragm 40, unlike the first embodiment.

Further, in the first embodiment, since the trapezoidal diaphragm 18 is designed in such a way that the shape thereof is reversed by pushing or pulling the trapezoidal diaphragm 18, the bottom of the trapezoidal diaphragm 18 may not smoothly move depending on the flexibility, the behavior, and other factors of the side wall portion when the shape is reversed. In contrast, since the diaphragm 40 according to the variation is produced by using a die to bend the side wall portion 40c in advance, the problem described above at the time of reversing the shape of the diaphragm is eliminated, whereby the bottom 40a can be smoothly moved.

2. Second Embodiment

A second embodiment will be described with reference to an exemplary electronic apparatus including a variable focal length lens according to an embodiment. The description will be made with reference to a case where a variable focal length lens according to an embodiment is incorporated in an imaging apparatus, such as a still camera and a video camcorder.

Figure 10:
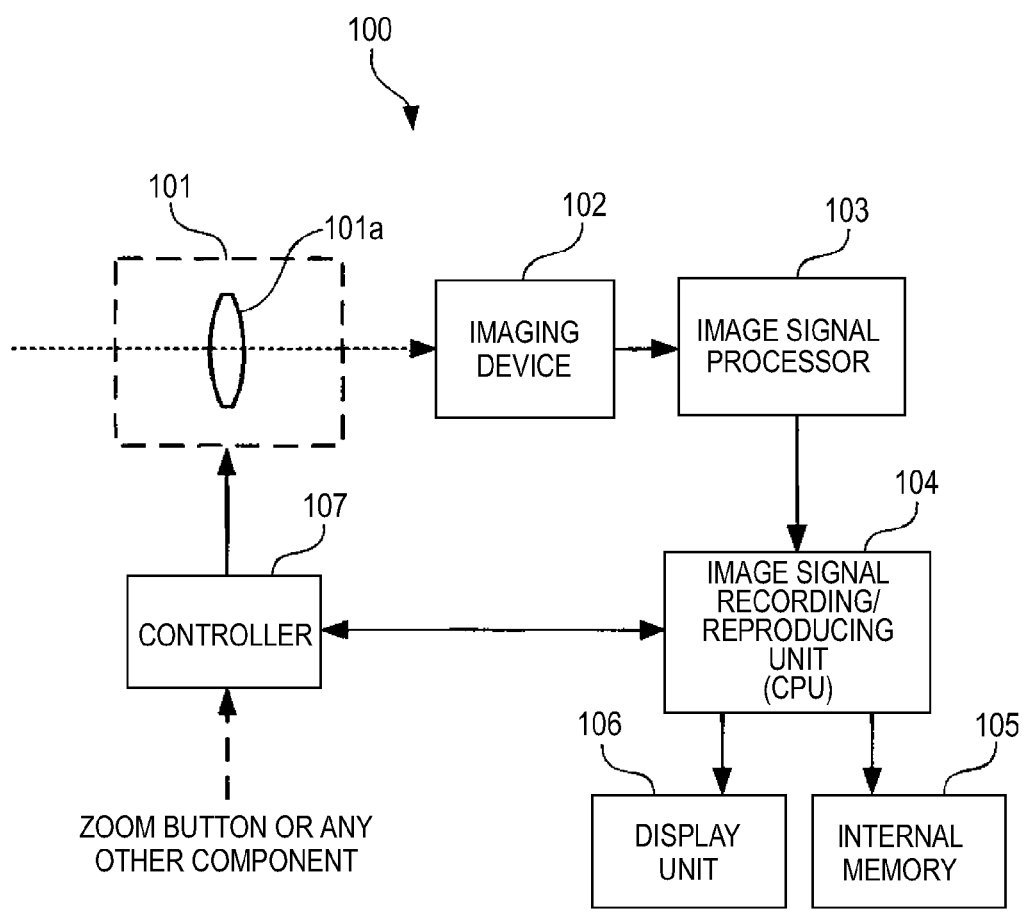
FIG. 10 is a schematic block diagram of an imaging apparatus according to a second embodiment.

FIG. 10 is a schematic block diagram of the imaging apparatus according to the present embodiment. The imaging apparatus 100 according to the present embodiment includes an imaging optical system 101, an imaging device 102 (imager), an image signal processor 103, an image signal recording/reproducing unit 104, an internal memory 105, a display unit 106, and a controller 107. The function and configuration of each of the components described above follow:

The imaging optical system 101 captures subject light and focuses it on an imaging surface (not shown) of the imaging device 102. The imaging optical system 101 includes a variable focal length lens 101a according to an embodiment. The variable focal length lens 101a can be a variable focal length lens according to an embodiment of the invention. For example, the variable focal length lens described, for example, in the first embodiment or the variation thereof can be used.

The imaging device 102 converts the subject light focused through the imaging optical system 101 into an electric image signal. An output terminal of the imaging device 102 is connected to an input terminal of the image signal processor 103, and the imaging device 102 outputs the produced image signal to the image signal processor 103. The imaging device 102 can be any of various types of image sensor, such as a CCD (Charge Coupled Device) image sensor and a CMOS (Complementary Metal Oxide Semiconductor) image sensor.

The image signal processor 103 performs predetermined image processing, such as correction and noise removal, on the image signal inputted from the imaging device 102. An output terminal of the image signal processor 103 is connected to an input terminal of the image signal recording/reproducing unit 104, and the image signal processor 103 outputs the signal having undergone the image processing to the image signal recording/reproducing unit 104.

The image signal recording/reproducing unit 104 includes a computing circuit, such as a microcomputer (CPU: Central Processing Unit), and controls recording and/or reproduction of the image signal inputted from the image signal processor 103. Specifically, the image signal recording/reproducing unit 104 is connected to the internal memory 105 and outputs the image signal inputted from the image signal processor 103 to the internal memory 105 when the image signal is desired to be recorded. Further, the image signal recording/reproducing unit 104 is connected to the display unit 106 and outputs the image signal inputted from the image signal processor 103 to the display unit 106 when the image signal is desired to be reproduced and displayed.

The internal memory 105 can be formed, for example, of an HDD (Hard Disk Drive), a semiconductor memory, or an optical disk. The internal memory 105 stores the image signal inputted from the image signal recording/reproducing unit 104.

The display unit 106 converts the image signal supplied from the image signal recording/reproducing unit 104 into a signal expressed in a format displayable on a display monitor and then displays the image signal thereon. The display unit 106 includes not only the display monitor but also a monitor driver that drives the display monitor. The display monitor can be formed, for example, of an LCD (Liquid Crystal Display) or an organic EL (Electro Luminescence) panel.

The controller 107 controls the action of each of the components in the imaging apparatus 100. The controller 107 also controls the action of the variable focal length lens 101a, specifically, the shape (curvature) of the lens surface (refraction surface) of the liquid lens portion of the variable focal length lens 101a, based on an operation signal produced, for example, when a zoom button is operated (a signal corresponding to the focal length).

As described above, in the imaging apparatus 100 of the present embodiment, the variable focal length lens 101a according to an embodiment of the invention is used in the imaging optical system 101, whereby the size of the imaging optical system 101 can be reduced.

3. Third Embodiment

The second embodiment has been described with reference to the case where an imaging apparatus is presented by way of example of the electronic apparatus in which a variable focal length lens according to an embodiment of the invention is incorporated, but the invention is not limited thereto. The variable focal length lens according to an embodiment of the invention can be incorporated in a mobile communication terminal and an information terminal, such as a personal computer and a PDA (Personal Digital Assistance), having an imaging function (camera module).

A third embodiment will be described with reference to a case where a variable focal length lens according to an embodiment of the invention is incorporated in a mobile communication terminal including a camera module. The mobile communication terminal used herein is what is called a mobile phone, a terminal that wirelessly communicates with a base station for wireless telephony.

[Configuration of Mobile Communication Terminal]

Figure 11:
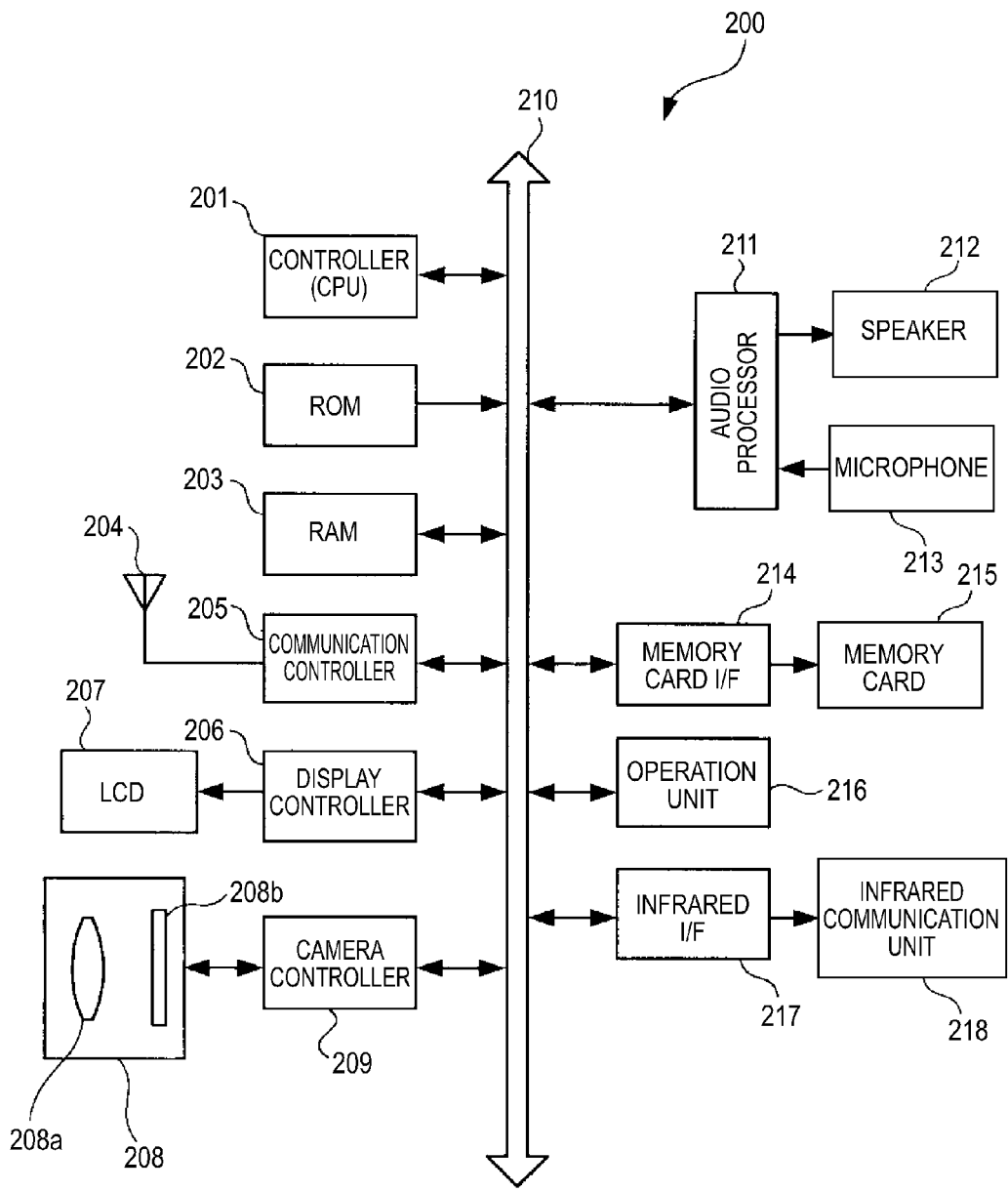
FIG. 11 is a schematic block diagram of a mobile communication terminal according to a third embodiment.

FIG. 11 is a schematic block diagram of the mobile communication terminal according to the present embodiment. The mobile communication terminal 200 includes a controller 201, a ROM (Read Only Memory) 202, a RAM (Random Access Memory) 203, an antenna 204, a communication controller 205, a display controller 206, and a display 207. The mobile communication terminal 200 further includes a camera module 208 and a camera controller 209 (controller).

The mobile communication terminal 200 further includes an audio processor 211 that performs digital/analog conversion on audio data during a call, a speaker 212 for outputting audio during a call, and a microphone 213 for receiving audio during a call. The mobile communication terminal 200 further includes a memory card interface 214, a memory card 215, an operation unit 216, an infrared interface 217, and an infrared communication unit 218. The components described above are electrically connected to one another directly or indirectly via a signal bus 210, as shown in FIG. 11. The function and configuration of each of the components described above follow:

The controller 201 is formed of a CPU or any other suitable computing control unit and controls the actions of the overall mobile communication terminal 200. Specifically, the controller 201 reads a control program stored in the ROM 202, unarchives the control program in the RAM 203, and controls the actions of the overall mobile communication terminal 200 via the signal bus 210.

The communication controller 205 transmits a transmission signal and receives a reception signal to and from a mobile phone base station (not shown) via the antenna 204. The communication controller 205 also modulates and demodulates radio waves transmitted and received to and from the mobile phone base station. Specifically, the communication controller 205 performs predetermined processing on received audio information and outputs the processed signal to the speaker 212 via the audio processor 211 in an audio call mode. The communication controller 205 further acquires audio collected through the microphone 213 via the audio processor 211, performs predetermined processing on the acquired information, and then transmits the processed signal via the antenna 204.

The display controller 206 converts an image signal supplied via the signal bus 210 into a signal expressed in a format displayable on the display 207 and outputs the converted signal to the display 207. The display 207 can be formed, for example, of an LCD (Liquid Crystal Display) or an organic EL (Electro Luminescence) panel, and displays the signal supplied from the display controller 206 as an image on a display screen.

The camera module 208 captures subject light, brings it into focus, and converts the focused subject light into an electric image signal. The camera module 208 then outputs the image signal to the camera controller 209. The camera module 208 includes an imaging optical system (not shown) including a variable focal length lens 208a and an imaging device 208b (imager).

A variable focal length lens according to an embodiment of the invention can be used as the variable focal length lens 208a. For example, the variable focal length lens described, for example, in the first embodiment or the variation thereof can be used. The imaging device 208b converts the subject light focused through the imaging optical system into an electric image signal. The imaging device 208b can be any of various types of image sensor, such as a CCD image sensor and a CMOS image sensor.

The memory card 215 can be formed, for example, of a semiconductor memory. Image information, such as still images and video images captured by the camera module 208, audio information obtained during an audio call, and other information are acquired via the memory card interface 214 and stored in the memory card 215.

The operation unit 216 is formed, for example, of a jog dial and a keypad. The operation unit 216 can be used to input telephone numbers, mail texts, and other information as well as input operation signals for setting a variety of modes. The operation unit 216 is further used to capture images through the camera module 208 and set modes in the camera module 208.

The infrared communication unit 218 includes, although not shown, an infrared light emitter and an infrared light receiver and can transmit and receive information to and from an external information apparatus capable of performing infrared communication, for example, a mobile phone, a personal computer, and a PDA. More specifically, the infrared communication unit 218 acquires image, audio, and other information stored in the memory card 215 or any other medium via the infrared interface 217 and transmits the acquired information to the external information apparatus. The infrared communication unit 218 further receives information transmitted from the external information apparatus and outputs the received signal to the memory card 215 or any other medium via the infrared interface 217.

Although not shown in FIG. 11, the mobile communication terminal 200 further includes a power source, which supplies electric power to the components in the mobile communication terminal 200.

[Recording and Reproducing Image Information]

A brief description will be made of recording and reproduction of an image signal captured by the camera module 208 in the mobile communication terminal 200 of the present embodiment.

First, the camera controller 209 drives and controls the camera module 208 to capture a still image, video images, or other images. The camera controller 209, for example, compresses the acquired image information by using JPEG, MPEG, or any other suitable compression technology. The camera controller 209 then outputs the compressed image information to the signal bus 210.

Thereafter, the RAM 203 acquires the image information via the signal bus 210 and temporarily stores the information. In this process, the RAM 203 may acquire not only the image information but also audio information recorded through the microphone 213 concurrently with the image information and temporarily store the image and audio information.

Further, in this process, the controller 201 may store the image information and/or the audio information as necessary in the memory card 215 via the memory card interface 214. Still further, in this process, the controller 201 may display the image information on the display 207 via the display controller 206 and output the audio information to the speaker 212 via the audio processor 211 as necessary.

The controller 201 may further transmit the acquired image and audio information to an external apparatus capable of performing infrared communication via the infrared communication unit 218 as necessary.

To read and display the image information stored in the RAM 203 or the memory card 215 on the display 207, the camera controller 209 temporarily reads the data stored in the RAM 203 or the memory card 215 and decodes or decompresses the data. The camera controller 209 then supplies the processed image data to the display controller 206 via the signal bus 210.

As described above, the mobile communication terminal 200 of the present embodiment includes the camera module 208 including the variable focal length lens 208a according to an embodiment of the invention. The mobile communication terminal 200 provided in the present embodiment can therefore be equipped with a smaller imaging mechanism (optical zoom mechanism).

The present embodiment has been described with reference to the case where the camera module 208 is separate from the camera controller 209, but the invention is not limited thereto and the camera module 208 may include the camera controller 209. Further, when the controller 201 can carry out the same control operations as those carried out by the camera controller 209 described above, the camera controller 209 may be omitted.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A variable focal length lens comprising:
a lens portion including a pair of light transmissive members, at least one of which is deformable, and a light transmissive liquid medium sealed between the pair of light transmissive members; and
a liquid medium container including a chamber that communicates with the lens portion and is filled with the liquid medium, the liquid medium container causing the shape of the surface of the deformable light transmissive member or members to be changed by changing the volume of the chamber to adjust the amount of liquid medium with which the lens portion is filled, wherein the liquid medium container further includes a diaphragm that seals the liquid medium in the chamber, the diaphragm has a tubular shape with a bottom whose area is smaller than that of an opening of the diaphragm, and the diaphragm is deformed to change the volume of the chamber.

2. The variable focal length lens according to claim 1,
wherein the liquid medium container further includes a diaphragm that seals the liquid medium in the chamber,
the diaphragm has a tubular shape with a bottom whose area is smaller than that of an opening of the diaphragm, and
the diaphragm is deformed to change the volume of the chamber.

3. The variable focal length lens according to claim 1,
further comprising a driver that deforms the diaphragm.

4. The variable focal length lens according to claim 1,
wherein the liquid medium container causes the shape of the surface of the deformable light transmissive member or members to deform within a range between a concave shape and a convex shape.

5. A camera module comprising:
a variable focal length lens including
a lens portion including a pair of light transmissive members, at least one of which is deformable, and a light transmissive liquid medium sealed between the pair of light transmissive members, and
a liquid medium container including a chamber that communicates with the lens portion and is filled with the liquid medium, the liquid medium container causing the shape of the surface of the deformable light transmissive member or members to be changed by changing the volume of the chamber to adjust the amount of liquid medium with which the lens portion is filled, wherein the liquid medium container further includes a diaphragm that seals the liquid medium in the chamber, the diaphragm has a tubular shape with a bottom whose area is smaller than that of an opening of the diaphragm, and the diaphragm is deformed to change the volume of the chamber; and
an imager that converts subject light incident through the variable focal length lens into an electric image signal.

6. The camera module according to claim 5,
further comprising a driver that deforms the diaphragm.

7. The camera module according to claim 5,
wherein the liquid medium container causes the shape of the surface of the deformable light transmissive member or members to deform within a range between a concave shape and a convex shape.

8. An electronic apparatus comprising:
a variable focal length lens including
a lens portion including a pair of light transmissive members, at least one of which is deformable, and a light transmissive liquid medium sealed between the pair of light transmissive members, and a liquid medium container including a chamber that communicates with the lens portion and is filled with the liquid medium, the liquid medium container causing the shape of the surface of the deformable light transmissive member or members to be changed by changing the volume of the chamber to adjust the amount of liquid medium with which the lens portion is filled, wherein the liquid medium container further includes a diaphragm that seals the liquid medium in the chamber, the diaphragm has a tubular shape with a bottom whose area is smaller than that of an opening of the diaphragm, and the diaphragm is deformed to change the volume of the chamber;

an imager that converts subject light incident through the variable focal length lens into an electric image signal; and a controller that drives and controls the variable focal length lens.

9. The electronic apparatus according to claim 8, further comprising a driver that deforms the diaphragm.

10. The electronic apparatus according to claim 8, wherein the liquid medium container causes the shape of the surface of the deformable light transmissive member or members to deform within a range between a concave shape and a convex shape.

* * * * *